Sept. 24, 1968 R. E. LUND 3,403,259

QUADRATURE VOLTAGE GENERATOR

Filed Feb. 11, 1966 3 Sheets-Sheet 1

INVENTOR.
ROGER E. LUND,
BY
Paul M. Coble
ATTORNEY.

3,403,259
Patented Sept. 24, 1968

3,403,259

QUADRATURE VOLTAGE GENERATOR

Roger E. Lund, Los Angeles, Calif., assignor to Hughes Aircraft Company, Culver City, Calif., a corporation of Delaware Filed Feb. 11, 1966, Ser. No. 526,857
9 Claims. (Cl. 250—205)

ABSTRACT OF THE DISCLOSURE

The disclosed quadrature voltage generator includes a photo-resistive element and a capacitor connected in series across an alternating voltage source. First and second voltages are generated indicating the respective voltages across the photo-resistive element and the capacitor. A feedback signal indicative of the relative magnitudes of the first and second voltages is applied to a light source positioned to illuminate the photo-resistive element. The feedback signal controls the intensity of the light emitted from the source so that the resistance of the photo-resistive element is regulated such that the magnitudes of the first and second voltages are maintained equal.

This invention relates to electrical signal generation, and more particularly relates to a circuit for generating voltages of equal amplitude which are 90° apart in phase over a wide range of frequencies.

As is well known, when an alternating voltage is applied across a resistor and capacitor connected in series, the resultant voltage across the resistor will lead the voltage across the capacitor by 90°. The impedance of the capacitor is, of course, a function of the frequency of the alternating voltage, and for some particular frequency the magnitude of the impedance of the capacitor will be equal to that of the resistor. However, for frequencies greater than this particular frequency, the impedance of the capacitor will be less than that of the resistor, resulting in a voltage of greater magnitude appearing across the resistor. On the other hand, for frequencies lower than the particular frequency, a voltage of greater magnitude will be developed across the capacitor on account of the increased impedance of the capacitor. Thus, it will be apparent that while a simple RC network can be used to generate quadrature voltages, these voltages will have the same magnitude at one frequency only.

In the past RC networks have been employed to generate equal magnitude quadrature voltages over a range of frequencies by utilizing manually variable resistors and/or capacitors. Such quadrature voltage generators are not only highly impractical for operating frequencies which are subject to frequent and rapid changes, but in addition the accuracy of such generators is limited by the precision of the components employed. Although precision resistors of capacitors (i.e., resistors or capacitors whose respective resistance or capacitance is accurate to within 1%) have been used to achieve the desired accuracy in some instances, the accuracy of even precision component generators is insufficient for certain applications. Moreover, the use of precision components adds greatly to the cost of the circuit.

Accordingly, it is an object of the present invention to provide a circuit for generating quadrature voltages of equal magnitude over a wide range of operating frequencies, and which circuit automatically adjusts itself for changes in the operating frequency.

It is a further object of the present invention to provide a circuit for generating equal magnitude quadrature voltages with greater accuracy than has been achievable with the prior art.

It is a still further object of the present invention to provide a quadrature voltage generator which does not require the use of precision resistors or capacitors.

It is still another object of the present invention to provide a resistance-capacitance quadrature voltage generator which not only monitors the quadrature voltages and adjusts the resistance so as to maintain the quadrature voltages at equal magnitudes, but which also compensates for loading of the capacitance by the monitoring circuitry.

In accordance with the foregoing objects, the quadrature voltage generator of the present invention includes a controllable resistance element having first and second terminals and a capacitance element connected between the second terminal and a third terminal. An alternating voltage is applied between the first and third terminals, and signal processing circuitry coupled to the first, second and third terminals provides a first voltage representative of the voltage across the resistance element and a second voltage representative of the voltage across the capacitance element. Means are provided for producing a signal indicative of the relative magnitudes of the first and second voltages, and further means responsive to this signal controls the resistance of the resistance element such that the magnitudes of the first and second voltages are maintained equal.

The controllable resistance element may take the form of a photo-resistive element providing a resistance which varies as a function of the intensity of incident light energy, with a light source being positioned to illuminate the photo-resistive element with light of variable intensity. The signal indicative of the relative magnitudes of the first and second voltages is fed back to the light source to control the intensity of the light energy emitted from the source so that the resistance of the photo-resistive element is maintained at the desired value.

A voltage divider may be coupled between the first and third terminals to apply to part of the signal processing circuitry a predetermined portion of the voltage between the first and third terminals which compensates for loading of the capacitance element by another part of the signal processing circuitry.

Other and further objects, advantages and characteristic features of the present invention will become readily apparent from consideration of the following detailed description of a preferred embodiment of the invention when considered in conjunction with the accompanying drawings in which:

FIG. 1 is a schematic diagram, primarily in block form, illustrating a quadrature voltage generator according to the invention;

FIGS. 2(*a*)-(*d*) are vector diagrams illustrating the voltages at various points in the generator of FIG. 1 for different exemplary operating conditions;

FIG. 3 parts (*a*) to (*g*) are graphs showing timing waveforms of voltage at various points in the generator of FIG. 1 for the aforementioned operating conditions;

Figure 1:
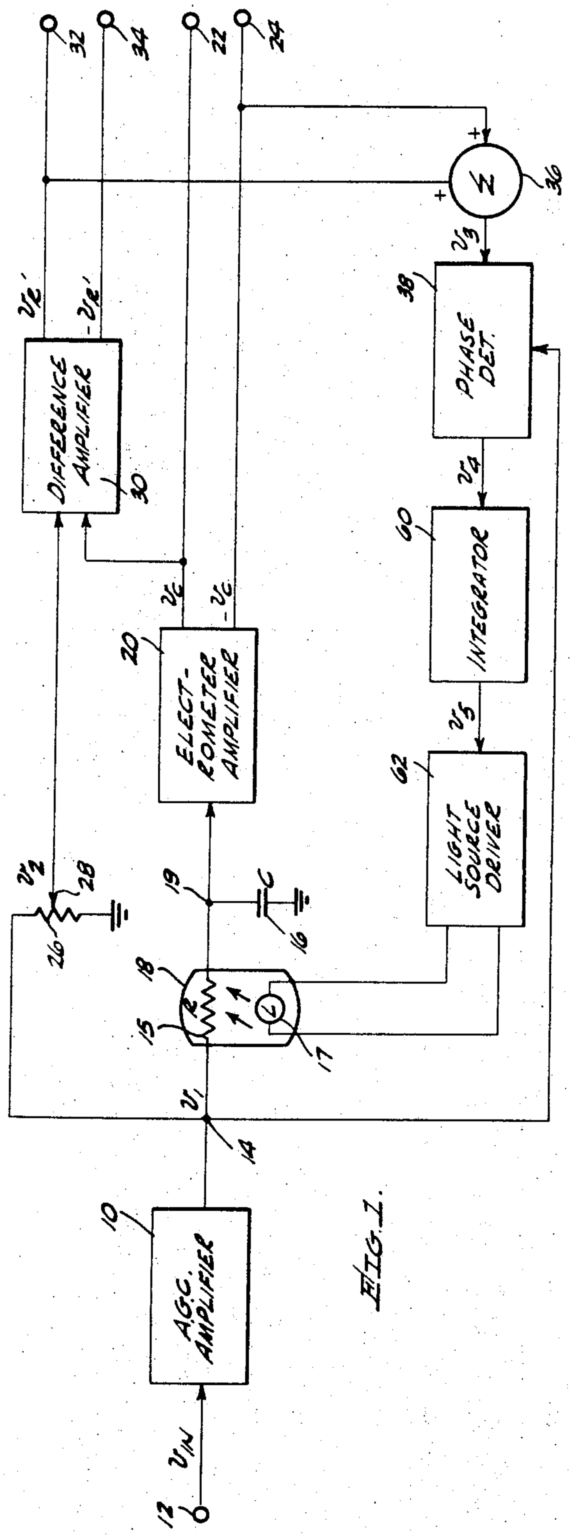

Referring with greater particularity to FIG. 1, a quadrature voltage generator according to the present invention may be seen to include an automatic gain control amplifier 10 to which is applied an alternating input voltage $v_{in}$ received at input terminal 12. (The voltages indicated as appearing at various points in FIG. 1 are to be considered referenced to the level designated as ground). The automatic gain control amplifier 10 functions to provide at its output terminal 14 an alternating output voltage $v_1$ of a given amplitude for input voltages $v_{in}$ of differing amplitudes. For example, for sinusoidal input voltages $v_{in}$ varying in amplitude between 1 and 5 volts, the automatic gain control amplifier 10 may provide a sinusoidal output voltage $v_1$ of the same frequency as the voltage $v_{in}$ but having a peak amplitude of 10 volts. The input voltage $v_{in}$ may be of a frequency which varies between 2 and 200 cycles per second, for example.

Connected in series between the output terminal 14 of the amplifier 10 and the ground level are a photo-resistive element 15 providing a resistance R and a capacitor 16 having a capacitance C. The resistance R of the photo-resistive element 15 varies inversely as a function of the intensity of incident light on the photo-resistive element 15 from a light source 17 positioned to illuminate the photo-resistive element 15. The intensity of the light emitted by the source 17 may be varied by varying the energizing electrical current applied to the source 17. The photo-resistive element 15 and the light source 17 may be combined into a single opto-electronic component 18 sold by the Raytheon Industrial Components Division of Newton, Mass., under the trade name Raysistor. For details concerning Raysistor devices, reference may be made to Technical Information Bulletin 169–I of the Raytheon Industrial components Division entitled "The Raysistor Applications."

Junction terminal 19 between resistance element 15 and capacitor 16 is connected to the input of an electrometer amplifier 20 so as to apply the voltage across the capacitor 16 to the amplifier 20. The electrometer amplifier 20 may be an operational amplifier having a push-pull output and providing unity gain between its input and each of a pair of outputs. Specifically, the amplifier 20 illustrated in FIG. 1 provides at a first output terminal 22 a voltage $v_C$ equal to the measured voltage across the capacitor 16 and provides at a second output terminal 24 a voltage $-v_C$ equal in magnitude to the voltage across the capacitor 16 but 180° out of phase with the capacitor voltage. The electrometer amplifier 20 should have as high an input impedance as practical in order to minimize loading of the capacitor 16.

The total voltage $v_1$ appearing across the series photo-resistive element 15 and capacitor 16 is fed to a voltage dividing potentiometer 26 which is connected between terminal 14 and ground. The potentiometer 26 has a movable tap 28 which may be set to provide a voltage $v_2$ equal to a predetermined portion of the voltage $v_1$ which compensates for measuring errors resulting from loading of the capacitor 16 by the electrometer amplifier 20. The theory and function of this compensation circuitry will be explained more fully below.

The potentiometer tap 28 is connected to one input of a difference amplifier 30 having its other input connected to output terminal 22 from the electrometer amplifier 20. The difference amplifier 30 may be an operational amplifier having a push-pull output and providing unity gain between its difference voltage input and each of a pair of outputs. Specifically, the difference amplifier 30 illustrated in FIG. 1 may provide at a first output terminal 32 a voltage $v_R'$ equal to the difference $(v_2-v_C)$ between the voltage at the potentiometer tap 28 and the voltage at output terminal 22, and may also provide at a second output terminal 34 a voltage $-v_R'$ equal to the difference $(v_C-v_2)$ between the voltage at terminal 22 and the voltage at the potentiometer tap 28. Since the voltage $v_C$ is equal to the measured voltage across the capacitor 16, and the voltage $v_2$ is representative of the total voltage across the photo-resistive element 15 and the capacitor 16, the voltage $v_R'$ is representative of the voltage across the photo-resistive element 15. The voltage $-v_R'$ is equal in magnitude but 180° out of phase with the voltage $v_R'$.

The voltage $v_R'$ at output terminal 34 and the voltage $-v_C$ at output terminal 24 are applied to the respective inputs of a two-input summing circuit 36, which may be a resistive summing network, for example, to produce a voltage $v_3$ equal to the sum of voltages $v_R'$ and $-v_C$. The output voltage $v_3$ from the summing circuit 36 is applied to a signal input of a phase detector 38 having a reference input which receives the voltage $v_1$ from the terminal 14. The phase detector 38 functions to compare the phase of the voltage $v_3$ with that of the reference voltage $v_1$ and to produce a voltage $v_4$ indicative of the difference in phase between the voltages $v_3$ and $v_1$.

Figures 2A, 2B, 2C, 2D, 4, 5:
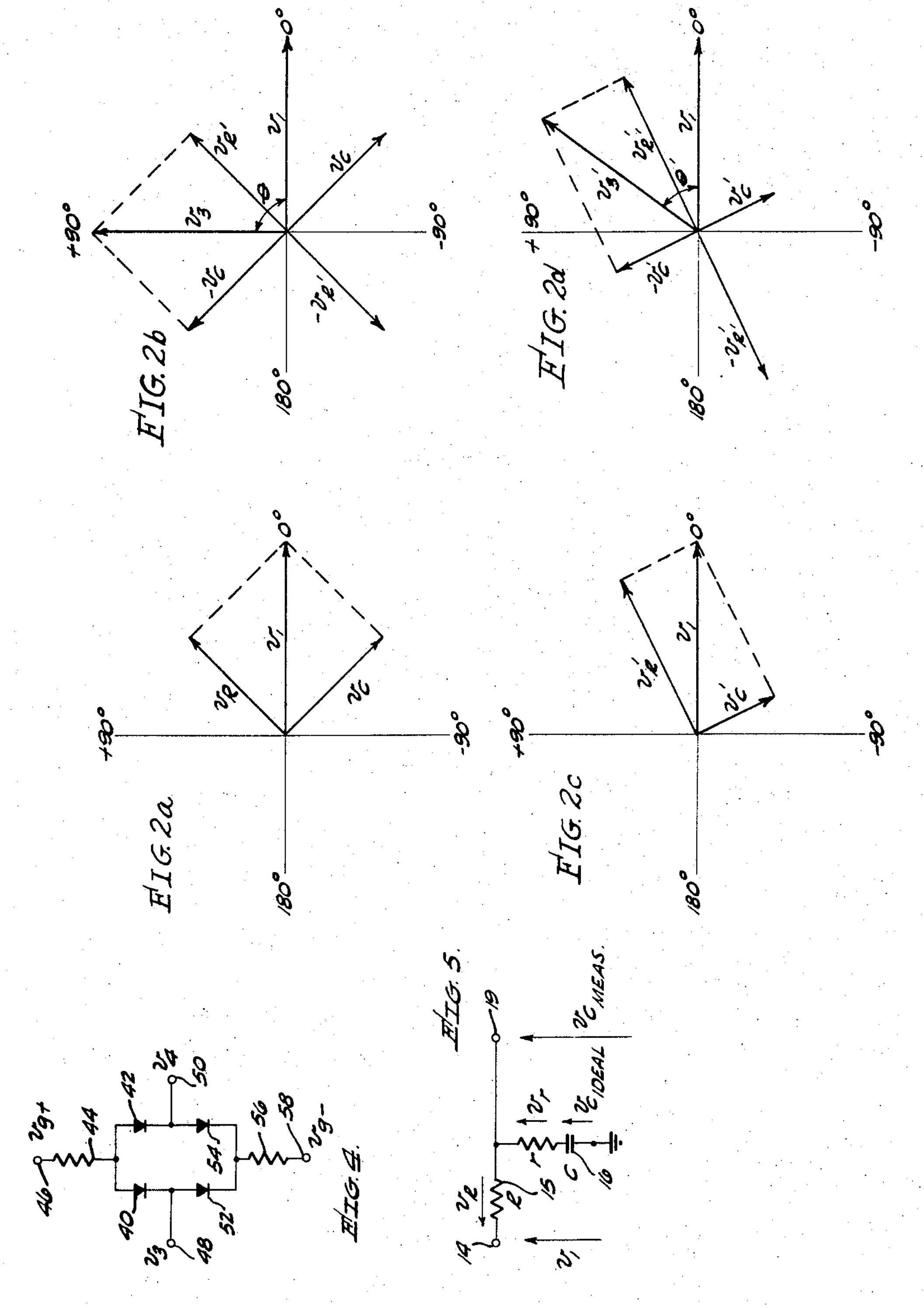
FIG. 4 is a schematic circuit diagram illustrating a portion of the phase detector block shown in FIG. 1.
FIG. 5 is a schematic circuit diagram illustrating an equivalent circuit involving the resistance-capacitance portion of the generator of FIG. 1.

The phase detector 38 may include a diode switching network, such as illustrated in FIG. 4, operating under the control of gating voltages generated from the reference voltage $v_1$. As shown in FIG. 4, the diode switching network for the phase detector 38 may include a first pair of diodes 40 and 42 having their anodes connected together. The junction between the anodes of the diodes 40 and 42 is connected via a resistor 44 to a terminal 46 which receives a positive gating voltage $v_{g+}$. The cathode of the diode 40 is connected to a terminal 48 which receives the phase detector input voltage $v_3$, while the cathode of the diode 42 is connected to a terminal 50 which provides the phase detector output voltage $v_4$. A second pair of diodes 52 and 54 have their anodes connected respectively to the terminals 48 and 50 and have their cathodes connected together. The junction between the cathodes of the diodes 52 and 54 is connected via a resistor 56 to a terminal 58 which receives a negative gating voltage $v_{g-}$. The gating voltages $v_{g+}$ and $v_{g-}$ are present for a predetermined portion of the cycle of the reference voltage $v_1$, during which time the voltage $v_3$ applied to the terminal 48 is passed to the terminal 50 where it appears as the voltage $v_4$.

The output voltage $v_4$ from the phase detector 38 is applied to an integrator 60 which produces an output voltage $v_5$ consisting of a D.C. component plus a variable component indicative of the integral of the voltage $v_4$ over the timing interval during which the phase detector gating voltages are present. The integrator output voltage $v_5$ is applied to a light source driver circuit 62 having its output connected to the light source 17 to vary the intensity of the light emitted by the source 17 in accordance with the variable component of the voltage $v_5$ and thereby control the resistance R of the photo-resistive element 15. The light source driver 62 may a D.C. power amplifier which provides sufficient current amplification to achieve the desired level of energizing current for the light source 17. Also, the light source driver amplifier 62 introduces a phase inversion of the variable component of the voltage $v_5$, i.e., the magnitude of output current from the driver amplifier 62 decreases in response to an increase in the magnitude of the voltage $v_5$, and vice versa.

The operation of the quardature voltage generator of FIG. 1 will now be discussed with reference to the vector diagrams of FIG. 2 and the timing waveforms of FIG. 3. As has been indicated above, it is desired that the generator of FIG. 1 assume a condition in which the impedance of the photo-resistive element 15 is equal in magnitude to the impedance of the capacitor 16. This condition is depicted in FIG. 2(*a*) from which it may be seen that the voltage $v_R$ across the photo-resistive element 15 leads the reference voltage $v_1$ by 45°, while the voltage $v_C$ across the capacitor 16 lags the voltage $v_1$ by 45°, the voltage $v_R$ and $v_C$ being equal in magnitude. Under such a condition the resultant voltages $v_R'$, $v_C$, $-v_R'$ and $-v_C$ produced at the respective output terminals 32, 22, 34 and 24 are as shown in FIG. 2(*b*). It may be seen from FIG. 2(*b*) that the voltage $v_R'$ leads the voltage $v_1$ by 45°, the voltage $-v_C$ leads the voltage $v_1$ by 135°, the voltage $v_C$ lags the voltage $v_1$ by 45°, and the voltage $-v_R'$ lags the voltage $v_1$ by 135°. The summing circuit 36 combines the voltages $v_R'$ and $-v_C$ to produce a voltage $v_3$ which leads the voltage $v_1$ by an angle $\theta$, which for the condition illustrated in FIG. 2(*b*) is equal to 90°.

Figure 3:
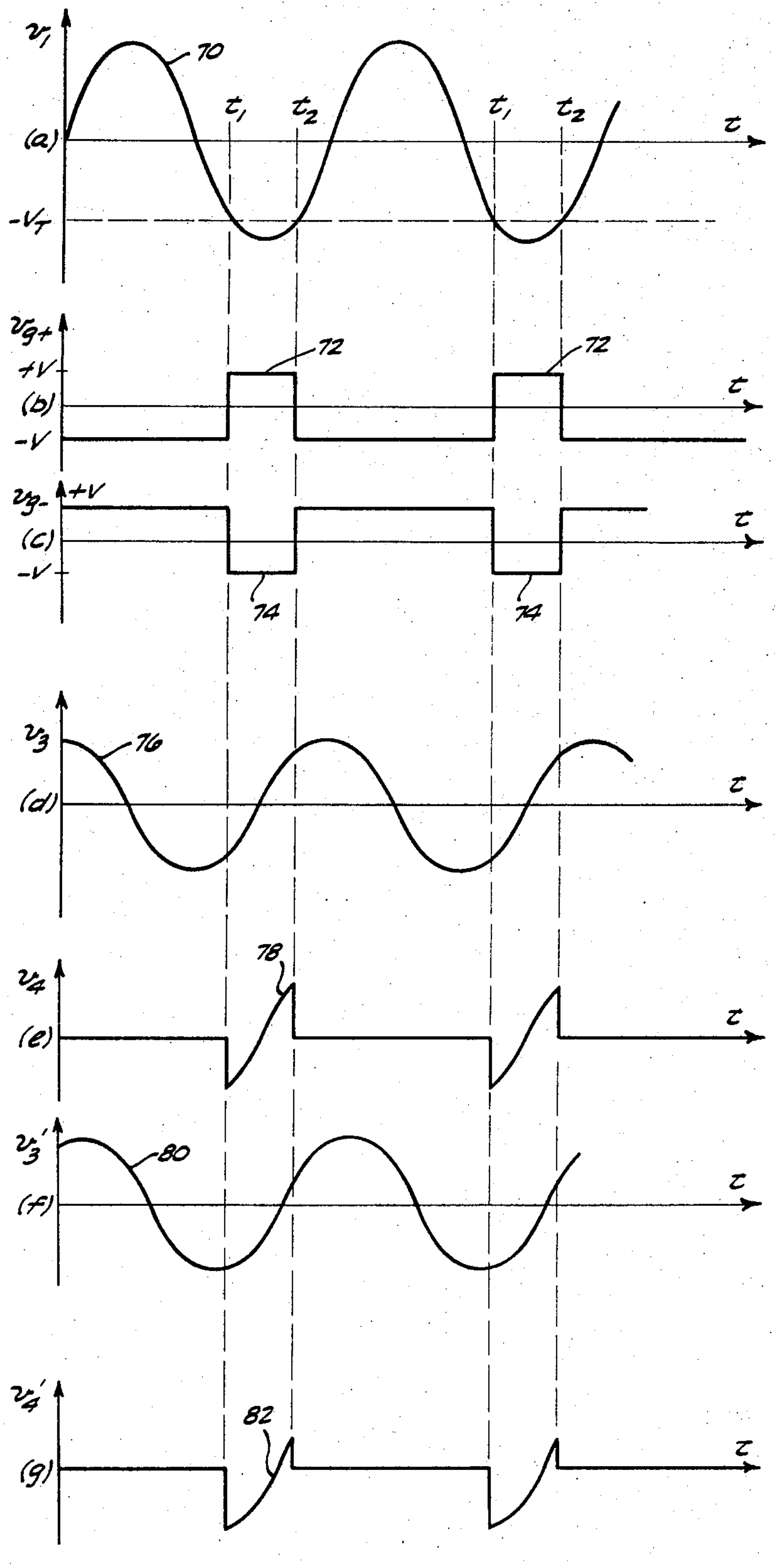

In the phase detector 38 the voltage $v_1$, which is depicted as a function of time by the waveform 70 of FIG. 3(*a*), is compared with a trigger voltage $-V_T$. When the voltage $v_1$ becomes more negative than the trigger level $-V_T$, both a positive gating pulse $v_{g+}$, illustrated at 72 in FIG. 3(*b*), and a negative gating pulse $v_{g-}$, illustrated at 74 in FIG. 3(*c*), are generated. The gating pulses 72 and 74 are present for the relatively short portion $t_1-t_2$ of the reference voltage cycle during which the reference voltage 70 is more negative than the trigger voltage $-V_T$. Thus, as may be seen from FIGS. 3(*b*) and (*c*), during the presence of the pulses 72 and 74, i.e., during the time interval $t_1-t_2$, the gating voltage $v_{g+}$ resides at a positive level $+V$, while the gating voltage $v_{g-}$ resides at a negative level $-V$. During the remainder of the reference voltage cycle the gating voltage $v_{g+}$ resides at the level $-V$, and the gating voltage $v_{g-}$ resides at the level $+V$.

During the absence of the gating pulses 72 and 74, the diodes 40, 42, 52 and 54 (FIG. 4) are reverse biased so that current is unable to flow between the terminals 46 and 58, and the voltage $v_3$ at the input terminal 48 is prevented from appearing at the output terminal 50. On the other hand, during the presence of the gating pulses 72 and 74, the diodes 40, 42, 52 and 54 are biased into conduction so that current flows between the terminals 46 and 58, and the voltage $v_3$ at the terminal 48 is passed to the terminal 50. The voltage $v_3$ is illustrated as a function of time by the waveform 76 of FIG. 3(*d*), while waveform 78 of FIG. 3(*e*) shows the voltage $v_4$ as a function of time. It may be seen that the voltage $v_4$ remains at the zero level except during the time interval $t_1-t_2$ when it equals the voltage $v_3$.

For the condition illustrated in FIG. 2(*b*) in which the voltage $v_3$ leads the voltage $v_1$ by 90°, the integral of the voltage $v_4$ (the net value of the area between the waveform 78 and the zero axis) over the time interval $t_1-t_2$ is zero. The resultant output voltage $v_5$ from the integrator 60 resides at a D.C. level which maintains a constant level of energizing current to the light source 17. The intensity of the resultant light emitted by the source 17 and incident upon the photo-resistive element 15 remains constant, thereby maintaining the resistance R of the photo-resistive element 15 at a constant value.

In the event of an increase in the frequency of the input voltage $v_{in}$, the magnitude of the impedance of capacitor 16 will become less than the magnitude of the impedance of photo-resistive element 15, resulting in a voltage $v_R'$ across the photo-resistive element 15 which is of greater magnitude than the voltage $v_C'$ across the capacitor 16. This condition is illustrated by the vector diagram of FIG. 2(*c*) from which it may be seen that the voltage $v_R'$ leads the voltage $v_1$ by less than 45°, while the voltage $v_C'$ lags the voltage $v_1$ by more than 45°. The resultant voltages $v_R'$, $v_C'$, $-v_R'$, and $-v_C'$ produced at the respective output terminals 32, 22, 34 and 24 are as illustrated in FIG. 2(*d*). The voltage $v_3'$ which now appears at the output from the summing circuit 36 leads the reference voltage $v_1$ by an angle $\theta'$, which for the condition illustrated in FIG. 3(*d*) may be seen to be less than 90°.

The voltage $v_3'$ now applied to the phase detector 38 is illustrated as a function of time by the waveform 80 of FIG. 3(*f*), while the resultant phase detector output voltage $v_4'$ is depicted by the waveform 82 of FIG. 3(*g*). It may be seen from FIG. 3(*g*) that during the time interval $t_1-t_2$ the net value of the area between the waveform 82 and the zero axis (hence the integral of the voltage 82) is negative. The resultant output voltage $v_5'$ from the integrator 60 decreases from its previous level, thereby causing the output current from the light source driver 62 to increase. The intensity of the light emitted by the source 17 and incident upon the photo-resistive element 15 is thus increased, resulting in a decrease in the resistance R of photo-resistive element 15 and a decrease in the voltage appearing across the element 15.

In the event of a decrease in the frequency of the input voltage $v_{in}$, the voltages at various points in the generator of FIG. 1 would change in a manner opposite to that described above so as to increase the resistance R of the photo-resistive element 15 and thereby increase the voltage across the element 15. Thus, the circuit of FIG. 1 functions to apply a feedback signal to the light source 17 to control the intensity of the light emitted by the source 17 so that the resistance R of the photo-resistive element 15 is adjusted to provide an impedance equal in magnitude to the impedance of the capacitor 16, regardless of the frequency of the input voltage. The voltages at the output terminals 32, 22, 34 and 24 thus assume the desired condition illustrated in FIG. 2(*b*) in which the respective output voltages at the terminals 32, 22, 34 and 24 have equal magnitude and are 90° apart in phase.

Figure 6:
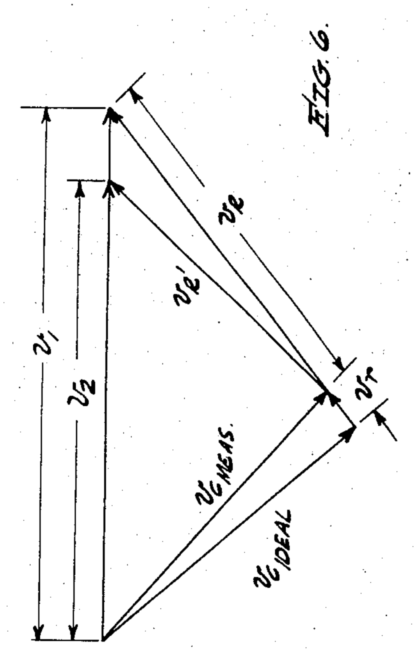
FIG. 6 is a vector diagram illustrating voltages present in the circuit of FIG. 5 for explaining the capacitance loading compensation feature of the generator of FIG. 1.

As has been mentioned above, the quadrature voltage generator of FIG. 1 incorporates potentiometer 26 to compensate for measuring errors due to loading of the capacitor 16 by the electrometer amplifier 20. The theory and function of this compensation circuitry will now be explained with reference to FIGS. 5 and 6. In spite of its high input impedance, the electrometer amplifier 20 does introduce a slight load on the capacitor 16, and which load is represented in the equivalent circuit of FIG. 5 by a resistance of value $r$ which appears in series with the capacitance C of capacitor 16. Thus, with the electrometer amplifier 20 connected into the circuit the RC network of FIG. 1 behaves the same as an RC network comprising a resistance of value $(R+r)$ in series with a capacitance of value C. As may be seen from FIG. 6, for such a network the voltage $V_{C_{ideal}}$ across the capacitance C lags the total voltage $(V_R+V_r)$ across the total resistance $(R+r)$ by 90°.

The measuring circuitry of FIG. 1, however, is unable to separate the equivalent resistance $r$ from the capacitance C. Rather, the circuit actually measures the voltage $v_{C_{meas.}}$ which appears between terminal 19 and ground, and it also indirectly measures the voltage $v_R$ which appears between the terminals 14 and 19. As may be seen from FIG. 6, the measured resistance voltage $v_R$ leads the measured capacitance voltage $v_{C_{meas.}}$ by an angle less than 90°. Nevertheless, a certain voltage $v_R$, exists which does lead the measured capacitance voltage $v_{C_{meas.}}$ by 90°, and this voltage $v_R'$ will be obtained if the total voltage across photo-resistive element 15 and capacitor 16 were reduced from the value $v_1$ to a new value $v_2$. Accordingly the tap 28 on the potentiometer 26 is set to feed to the difference amplifier 30 the predetermined portion $v_2$ of the voltage $v_1$ necessary to provide a 90° phase difference between the measured resistance voltage $v_R'$ and the measured capacitance voltage $V_{C_{meas.}}$. Thus, the quadrature voltage generator of the present invention is able to provide highly accurate quadrature voltages of equal magnitude which are not impaired by loading effects of the measuring circuitry.

Although the present invention has been shown and described with reference to a particular embodiment, nevertheless, various changes and modifications obvious to a person skilled in the art to which the invention pertains are deemed to lie within the spirit and scope of the invention as set forth in the appended claims.

What is claimed is:

1. A quadrature voltage generator comprising: a photo-resistive element having first and second terminals and providing therebetween a resistance which varies in accordance with incident light energy; a capacitance element connected between said second terminal and a third terminal; means for applying an alternating voltage between said first and third terminals; means coupled to said first, second and third terminals for providing a first voltage representative of the voltage across said photoresistive element and a second voltage representative of the voltage across said capacitance element; means for producing a signal indicative of the relative magnitudes of said first and second voltages; and means responsive to said signal for irradiating said photoresistive element with light energy to control the resistance of said photoresistive element such that the magnitudes of said first and second voltages are maintained equal.

2. A quadrature voltage generator comprising: a photo-resistive element having first and second terminals and providing therebetween a resistance which varies as a function of the intensity of incident light energy; a light source positioned to illuminate said photo-resistive element with light of variable intensity; a capacitance element connected between said second terminal and a third terminal; means for applying an alternating voltage between said first and third terminals; means coupled to said first, second and third terminals for providing a first voltage representative of the voltage across said photo-resistive element and a second voltage representative of the voltage across said capacitance element; means for producing a signal indicative of the relative magnitudes of said first and second voltages; and means for feeding said signal back to said light source to control the intensity of the light energy emitted therefrom so that the resistance of said photo-resistive element assumes a value such that the magnitudes of said first and second voltages are maintained equal.

3. A quadrature voltage generator comprising: a controllable resistance element having first and second terminals; a capacitance element connected between said second terminal and a third terminal; means for applying an alternating voltage between said first and third terminals; first signal processing means coupled to said second and third terminals for providing first and second voltages of equal magnitude separated in phase by 180° and each representative of the voltage across said capacitance element; second signal processing means coupled to said first and third terminals and to said first signal processing means for providing third and fourth voltages of equal magnitude separated in phase by 180° and each representative of the difference between said alternating voltage and one of said first and second voltages, means for producing a signal indicative of the relative magnitudes of one of said first and second voltages and one of said third and fourth voltages and means responsive to said signal for controlling the resistance of said resistance element such that the magnitudes of said first, second, third and fourth voltages are maintained equal.

4. A quadrature voltage generator comprising: a controllable resistance element having first and second terminals; a capacitance element connected between said second terminal and a third terminal; means for applying an alternating voltage between said first and third terminals; means coupled to said first, second and third terminals for providing a first voltage representative of the voltage across said resistance element and a second voltage representative of the voltage across said capacitance element; means for producing a third voltage having a phase relative to said alternating voltage which is indicative of the relative magnitudes of said first and second voltages; means for comparing the phase of said third voltage with that of said alternating voltage and for producing a signal indicative of the phase difference therebetween; and means responsive to said signal for adjusting the resistance of said resistance element to a value such that the magnitudes of said first and second voltages are maintained equal.

5. A quadrature voltage generator comprising: a controllable resistance element having first and second terminals; a capacitance element connected between said second terminal and a third terminal; means for applying an alternating voltage between said first and third terminals, means coupled to said first, second and third terminals for providing a first voltage representative of the voltage across said resistance element and a second voltage representative of the voltage across said capacitance element; means for producing a third voltage having a phase relative to said alternating voltage which is indicative of the relative magnitudes of said first and second voltages; means for producing a fourth voltage indicative of the instantaneous value of said third voltage during a predetermined portion of the cycle of said alternating voltage; means for integrating said fourth voltage to produce a fifth voltage indicative of the integral of said fourth voltage during said predetermined portion of said cycle; and means responsive to said fifth voltage for controlling the resistance of said resistance element such that the magnitudes of said first and second voltages are maintained equal.

6. A quadrature voltage generator comprising: a photo-resistive element having first and second terminals and providing therebetween a resistance which varies as a function of the intensity of incident light energy; a light source positioned to illuminate said photo-resistive element with light of variable intensity; a capacitance element connected between said second terminal and a third terminal; means for applying an alternating voltage between said first and third terminals; an electrometer amplifier having an input coupled between said second and third terminals; a difference amplifier having a first input coupled between said first and third terminals and a second input coupled between an output of said electrometer amplifier and said third terminal; a summing circuit having one input coupled to an output of said difference amplifier and another input coupled to an output of said electrometer amplifier; a phase detector having a signal input coupled to an output of said summing circuit and a reference input coupled to said first terminal; an integrator having an input coupled to an output of said phase detector; and means coupled between said integrator and said light source for energizing said light source with current of a magnitude determined by an output signal from said integrator.

7. A quadrature voltage generator comprising: a controllable resistance element having first and second terminals; a capacitance element connected between said second terminal and a third terminal; means for applying an alternating voltage between said first and third terminals; first signal processing means coupled to said second and third terminals for providing a first voltage representative of the voltage across said capacitance element; voltage dividing means coupled between said first and third terminals for providing a second voltage equal to a predetermined portion of said alternating voltage such that a voltage equal to the difference between said second voltage and said first voltage will lead said first voltage by 90°; second signal processing means coupled to said voltage dividing means and to said first signal processing means for providing a third voltage representative of the difference between said second voltage and said first voltage; means for producing a signal indicative of the relative magnitudes of said first and third voltages; and means responsive to said signal for controlling the resistance of said resistance element such that the magnitudes of said first and third voltages are maintained equal.

8. A quadrature voltage generator comprising: a controllable resistance element having first and second terminals; a capacitance element connected between said second terminal and a third terminal; means for applying an alternating voltage between said first and third terminals; first signal processing means coupled to said second and third terminals for providing a first voltage representative of the voltage across said capacitance element; a potentiometer having first and second fixed terminals respectively connected to said first and third terminals and having a movable tap; second signal processing means coupled to said movable tap and to said first signal processing means for providing a second voltage representative of the difference between the voltage at said movable tap and said first voltage; means for producing a signal indicative of the relative magnitudes of said first and second voltages; and means responsive to said signal for controlling the resistance of said resistance element such that the magnitudes of said first and second voltages are maintained equal.

9. A circuit for generating a plurality of voltages of equal magnitude and respectively separated in phase by 90° comprising: a photo-resistive element having first and second terminals and providing therebetween a resistance which varies as a function of the intensity of incident light energy; a light source positioned to illuminate said photo-resistive element with light of variable intensity; a capacitance element connected between said second terminal and a third terminal; amplifier means for applying an alternating voltage of essentially constant peak amplitude between said first and third terminals; a potentiometer having first and second fixed terminals respectively connected to said first and third terminals and having a movable tap; electrometer amplifier means having an input coupled between said second and third terminals for providing first and second voltages of equal magnitude separated in phase by 180° and each representative of the voltage across said capacitance element; difference amplifier means having a first input coupled between said movable tap and said third terminal and a second input coupled between an output of said electrometer amplifier means and said third terminal for providing third and fourth voltages of equal magnitude separated in phase by 180° and each representative of the difference between the voltage at said movable tap and one of said first and second voltages; summing circuit means having one input coupled to an output of said difference amplifier means and another input coupled to an output of said electrometer amplifier means for producing a fifth voltage having a phase relative to said alternating voltage which is indicative of the relative magnitudes of one of said first and second voltages and one of said third and fourth voltages; phase detector means having a signal input coupled to an output of said summing circuit means and a reference input coupled to said first terminal for producing a sixth voltage indicative of the instantaneous value of said fifth voltage during a predetermined portion of the cycle of said alternating voltage; integrator means having an input coupled to an output of said phase detector means for integrating said sixth voltage to produce a seventh voltage indicative of the integral of said fifth voltage during said predetermined portion of said cycle; and means coupled between said integrator means and said light source for energizing said light source with current of a magnitude determined by said seventh voltage to control the intensity of the light energy emitted from said light source so that the resistance of said photo-resistive element assumes a value such that the magnitudes of said first, second, third and fourth voltages are maintained equal.

References Cited

Analysis of Electric Circuits, by Brenner and Javid, McGraw-Hill, 1960, p. 215.

RALPH G. NILSON, *Primary Examiner.*

H. ABRAMSON, *Assistant Examiner.*